United States Patent
Westerman et al.

(10) Patent No.: US 6,343,464 B1
(45) Date of Patent: Feb. 5, 2002

(54) SOLAR THERMAL ROCKET

(75) Inventors: Kurt Ogg Westerman, Forest; Richard Vail DeMars, Lynchburg; Barry Gene Miller, Goode, all of VA (US)

(73) Assignee: BWX Technologies, Inc., Lynchburg, VA (US)

(*) Notice: Subject to any disclaimer, the term of this patent is extended or adjusted under 35 U.S.C. 154(b) by 0 days.

(21) Appl. No.: 09/563,046

(22) Filed: May 1, 2000

(51) Int. Cl.⁷ ................................................. G21D 11/00
(52) U.S. Cl. .................. 60/203.1; 60/200.1; 60/641.15; 60/641.8
(58) Field of Search ............................. 60/203.1, 200.1, 60/641.15, 641.8

(56) References Cited

U.S. PATENT DOCUMENTS

| 4,815,443 A | * | 3/1989 | Vrolyk et al. ................ 126/438 |
| 6,065,284 A | * | 5/2000 | Horner et al. ............. 60/203.1 |

* cited by examiner

Primary Examiner—Charles G. Freay
Assistant Examiner—E. Hayes
(74) Attorney, Agent, or Firm—D. Neil LaHaye; R. C. Baraona

(57) ABSTRACT

A thermal solar rocket that includes a solar energy receiver having two sections (a thermal energy storage section and a direct gain section), a solar concentrator, and a propulsion nozzle. In one embodiment, the focus of the solar energy between the storage section and the direct gain section is controlled by mechanical means such as movable insulation. In another embodiment, the focus of the solar energy between the storage section and the direct gain section is controlled by an optical switch in the form of relative motion between the solar concentrator and the solar energy receiver.

7 Claims, 4 Drawing Sheets

SOLAR THERMAL ROCKET

BACKGROUND OF THE INVENTION

1. Field of the Invention

The invention is generally related to rockets and more particularly to solar thermal rockets.

2. General Background

Solar thermal rockets were first proposed in 1954 as a way to provide greater specific impulse than chemical rockets. These devices use the sun's energy to heat a propellant (typically hydrogen) to extremely high temperatures and then expel the hot gas through a nozzle to provide thrust. The high temperature and low mass of the propellant combine to produce a specific impulse of two to four times that of a chemical rocket. Previously, solar thermal rockets have been of either a "direct gain" design in which the propellant is heated directly by very large solar collectors during a long continuous burn, or of a "thermal energy storage" design which collects and stores energy from smaller collectors for use in short pulse burns. Each of these designs has its own advantages, but both have significant drawbacks that have prevented them from achieving commercial production.

The direct gain rocket uses a very large solar collector (concentrator) to heat hydrogen propellant as it passes through a cavity comprised of refractory metal tubes (typically rhenium). The advantage of this type of rocket is that the temperature of the propellant can be extremely high (theoretically greater than 3,000 degrees Kelvin), thus providing high specific impulse thrust. The problem with this design is that the solar collector must be extremely large (often one hundred to one hundred fifty feet in diameter) to provide enough energy to heat the propellant from its stored temperature of 300 degrees Kelvin to the desired temperature of greater than 3,000 degrees Kelvin. Concentrator technology has not matured to the point where such concentrators are available for space applications (i.e., light enough and in a small enough package to fit existing space launch vehicles) and it is arguable that this technology is still decades away.

The thermal energy storage design solves the concentrator problem by collecting and storing solar energy over an orbital period then using the stored energy to provide thrust for a short pulse burn. A number of these pulses are required to get the spacecraft to its destination. The longer the storage phase of the mission, the smaller the collector can be. This approach can enable the use of existing collector technology to develop a rocket. However, the drawback to such a system is that the energy storage materials (typically rhenium coated graphite or tungsten encapsulated boron nitride) have temperature limitations well below that of a direct gain rocket. Current designs are limited to about 2,400 degrees Kelvin, so the performance is well below that of a direct gain system. Solar rockets at 2,400 degrees Kelvin do not provide great enough performance margins over conventional chemical rockets to justify their development costs.

Thus, since the idea of a solar thermal rocket was first proposed, an operational system has yet to be developed. To make a practical system, one must find a way to reduce the size of the solar collectors without limiting the temperature of the receiver cavity.

SUMMARY OF THE INVENTION

The invention addresses the above need. What is provided is a solar thermal rocket that includes a solar energy receiver having two sections (a thermal energy storage section and a direct gain section), a solar concentrator, and a propulsion nozzle. In one embodiment, the focus of the solar energy between the storage section and the direct gain section is controlled by mechanical means such as movable insulation. In another embodiment, the focus of the solar energy between the storage section and the direct gain section is controlled by an optical switch in the form of relative motion between the solar concentrator and the solar energy receiver. Propellant is first heated by the thermal energy storage section and then the direct gain section before being directed to a propulsion nozzle.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
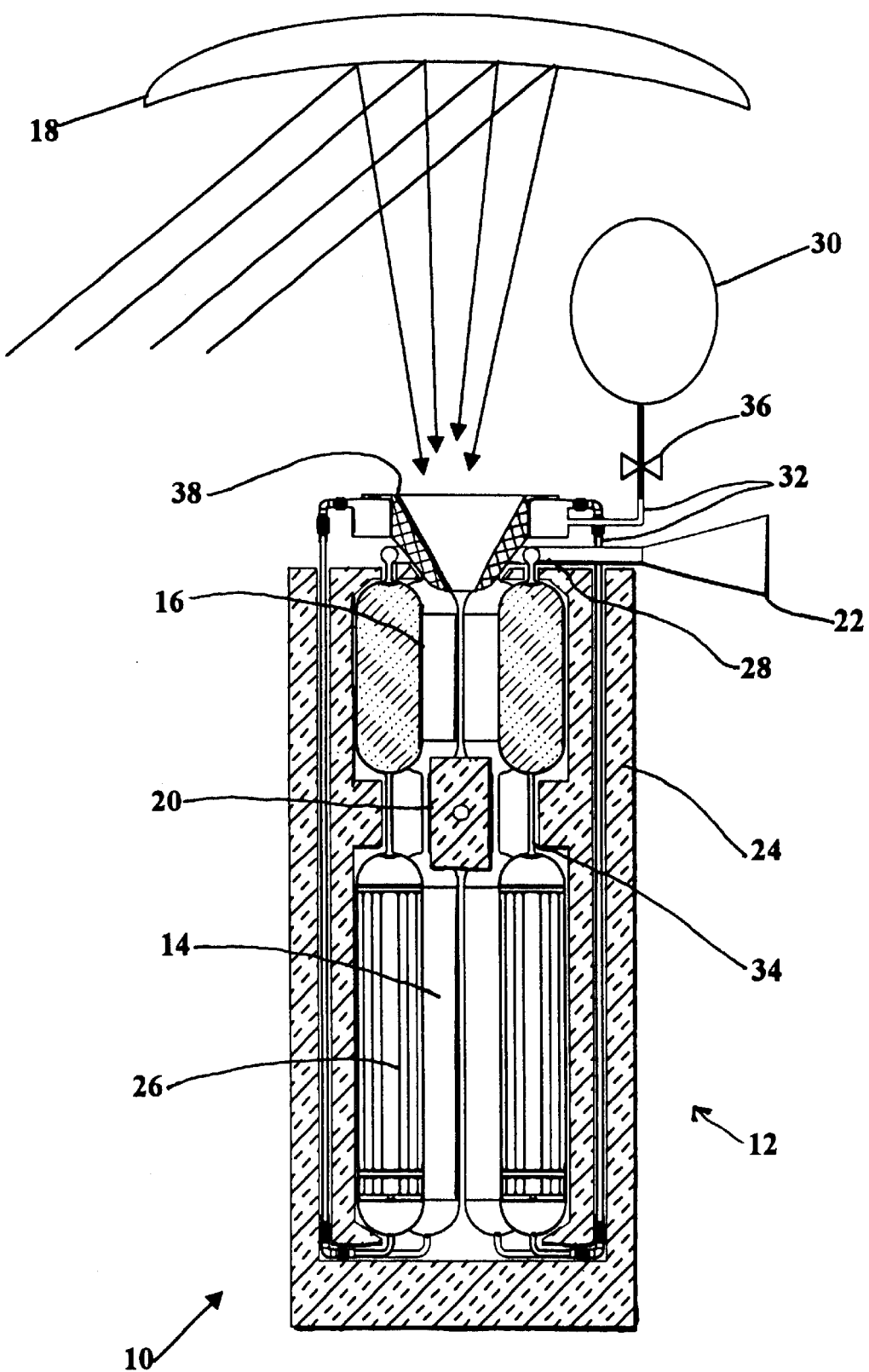
FIG. 1 schematically illustrates the preferred embodiment of the invention in position for directing solar energy to the thermal energy storage section.

Referring to the drawings, it is seen in FIG. 1 that the invention is generally indicated by the numeral 10. Thermal solar rocket 10 is generally comprised of a solar energy receiver 12 that is formed from a thermal energy storage section 14 and a direct gain section 16, a solar concentrator 18, means 20 for selectively directing solar energy to either the thermal energy storage section 12 or the direct gain section 14, and a propulsion nozzle 22.

Thermal energy storage sections are generally known but will be described for the sake of clarity. Thermal energy storage section 14 is a container with insulation material 24 provided in the walls. The walls define a cavity in the container. Thermal energy storage material 26 provided in the cavity is typically formed from graphite rods clad in rhenium. The thermal energy storage section is in fluid communication with the direct gain section 16 via piping 34.

The direct gain section 16 is comprised of refractory metal tubes (typically rhenium) and is positioned adjacent means 20. The metal tubes are provided with channels through which the gaseous propellant flows. The gaseous propellant is heated as it flows through the channels. Insulation material 24 is also provided around the direct gain section 16. The direct gain section is in fluid communication with the propulsion nozzle 22 via piping 28. As seen in the drawings, a gap is left in the insulation material 24 around the direct gain section 16 to allow the solar energy from the solar concentrator into the direct gain section 16 and the thermal energy storage section 14.

The solar concentrator 18 collects and focuses solar rays into the solar energy receiver 12. Solar concentrators are generally known and may have a parabolic shape or may be formed from a refractive or fresnel lens. A secondary solar concentrator 38 may be provided in the insulation gap on the direct gain section to further focus the solar rays. The secondary solar concentrator would result in a reduction of the accuracy requirements of the solar concentrator 18.

Figure 2:
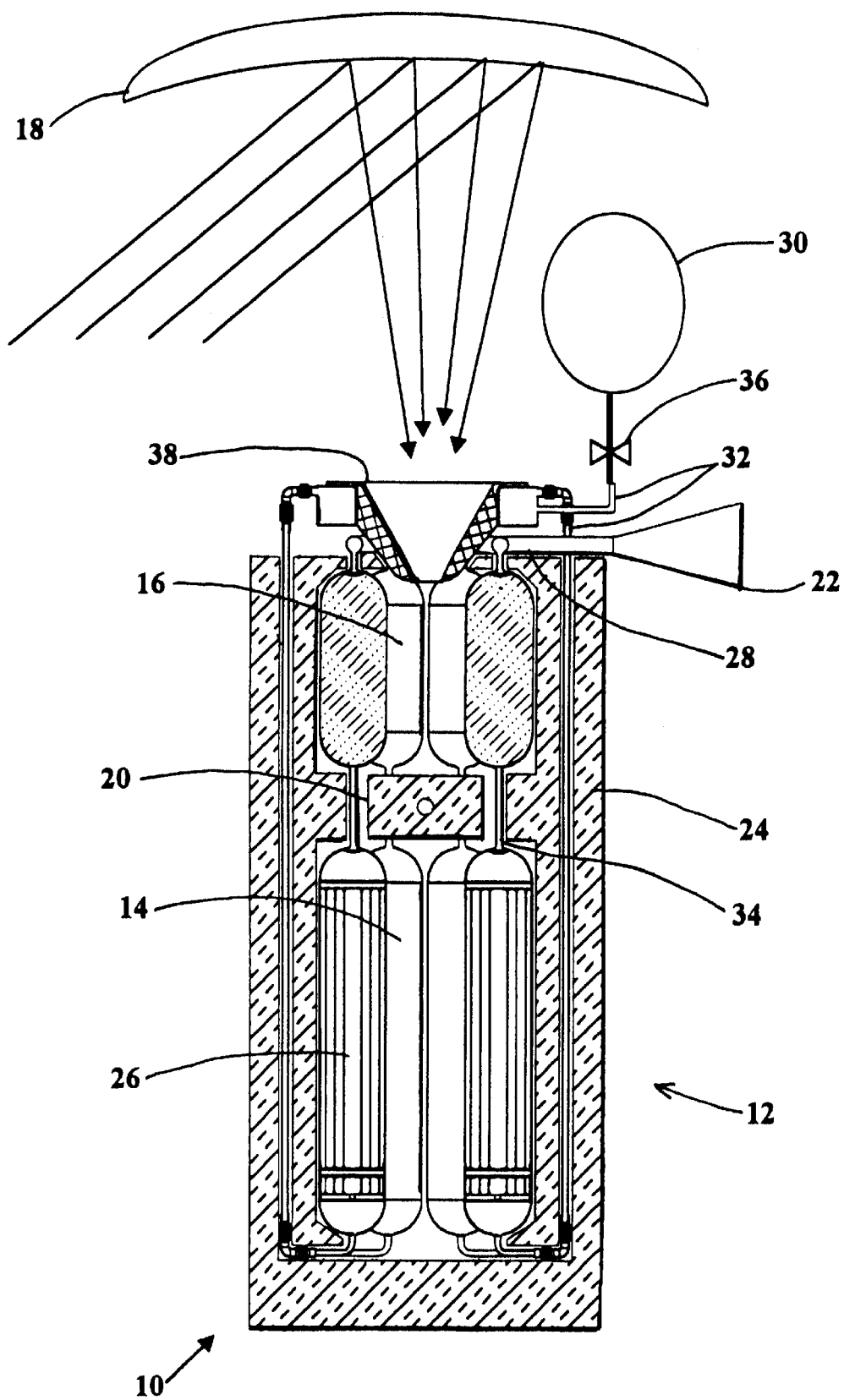
FIG. 2 schematically illustrates the preferred embodiment of the invention in position for directing solar energy to the direct gain section.

In the preferred embodiment of FIGS. 1 and 2, means 20 for selectively directing solar energy to either the thermal energy storage section 14 or the direct gain section 16 is provided in the form of a movable wall of insulation material 24. In the first open position seen in FIG. 1, the solar rays from the concentrator 18 are directed into the thermal energy storage section 14 for heating the storage material 26. In the second closed position seen in FIG. 2, the solar rays from the concentrator 18 are blocked by the insulation and thus heat the direct gain section 16.

A propellant supply tank 30 contains a suitable gaseous propellant such as hydrogen. The tank is in fluid communication with the thermal energy storage section via piping 32 for selectively supplying propellant to the solar energy receiver during the propulsion phase by means of a valve 36 in piping 32.

Operation is generally as follows. In the thermal energy collection and storage phase of the orbital period, means 20 is held in the first open position seen in FIG. 1. Solar rays are indicated by the lines striking the solar concentrator 18. The arrows indicate the reflected solar rays. This allows the solar rays from the concentrator to heat the thermal energy storage section 14 to a temperature of approximately two thousand four hundred degrees Kelvin (for a rhenium/graphite cavity). Once the maximum temperature is achieved, means 20 is moved to the second closed position seen in FIG. 2. In this position, the solar rays from the concentrator 18 heat the direct gain section to at least three thousand degrees Kelvin. During the propulsion phase, propellant is released into the thermal energy storage section 14 where it is heated to approximately the temperature of this section. The heated propellant then flows into the direct gain section via piping 34 where it is further heated to approximately the temperature of this section. The heated propellant then flows through piping 28 to the propulsion nozzle where it produces thrust.

Figure 3:
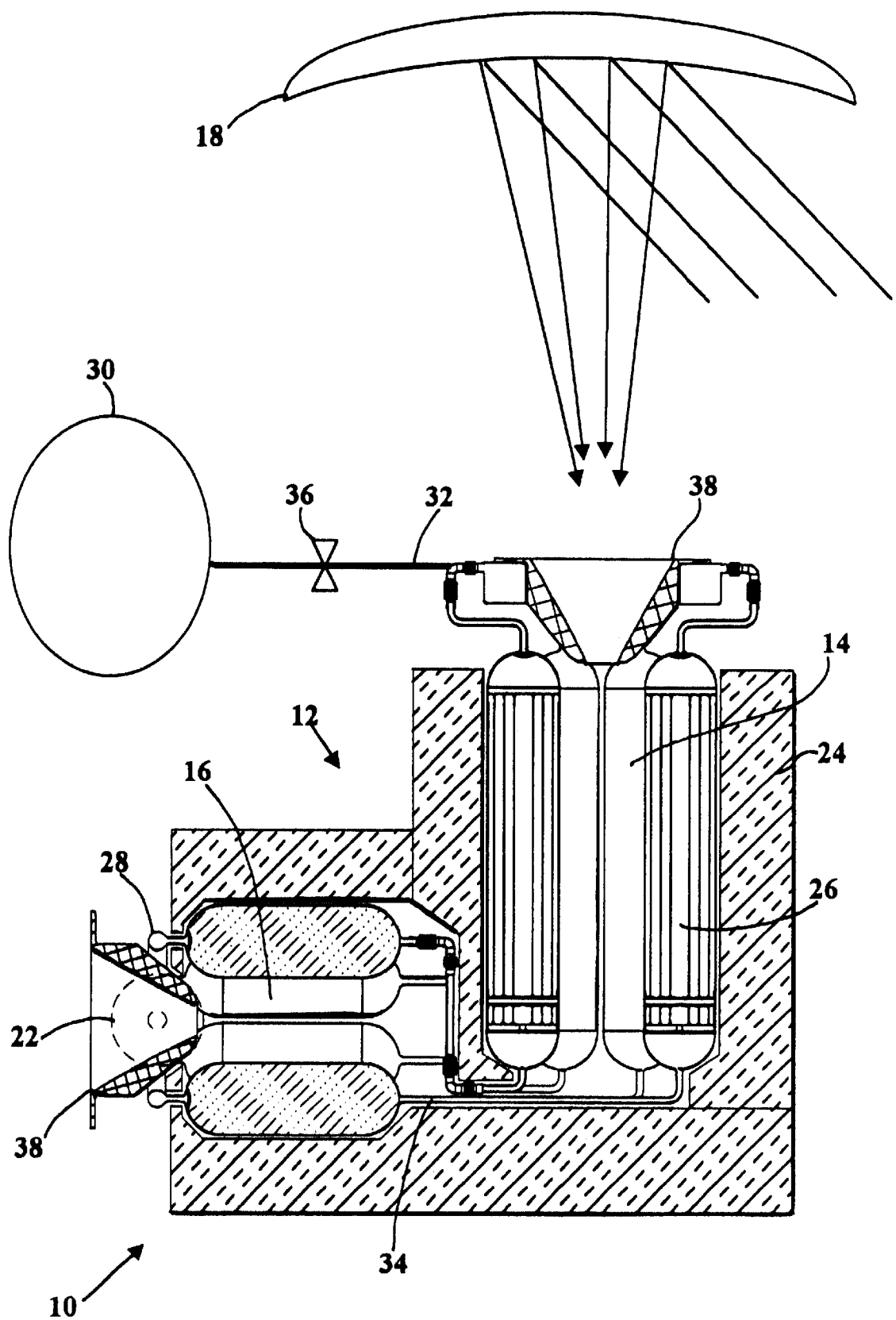
FIG. 3 schematically illustrates the alternate embodiment of the invention in position for directing solar energy to the thermal energy storage section.
Figure 4:
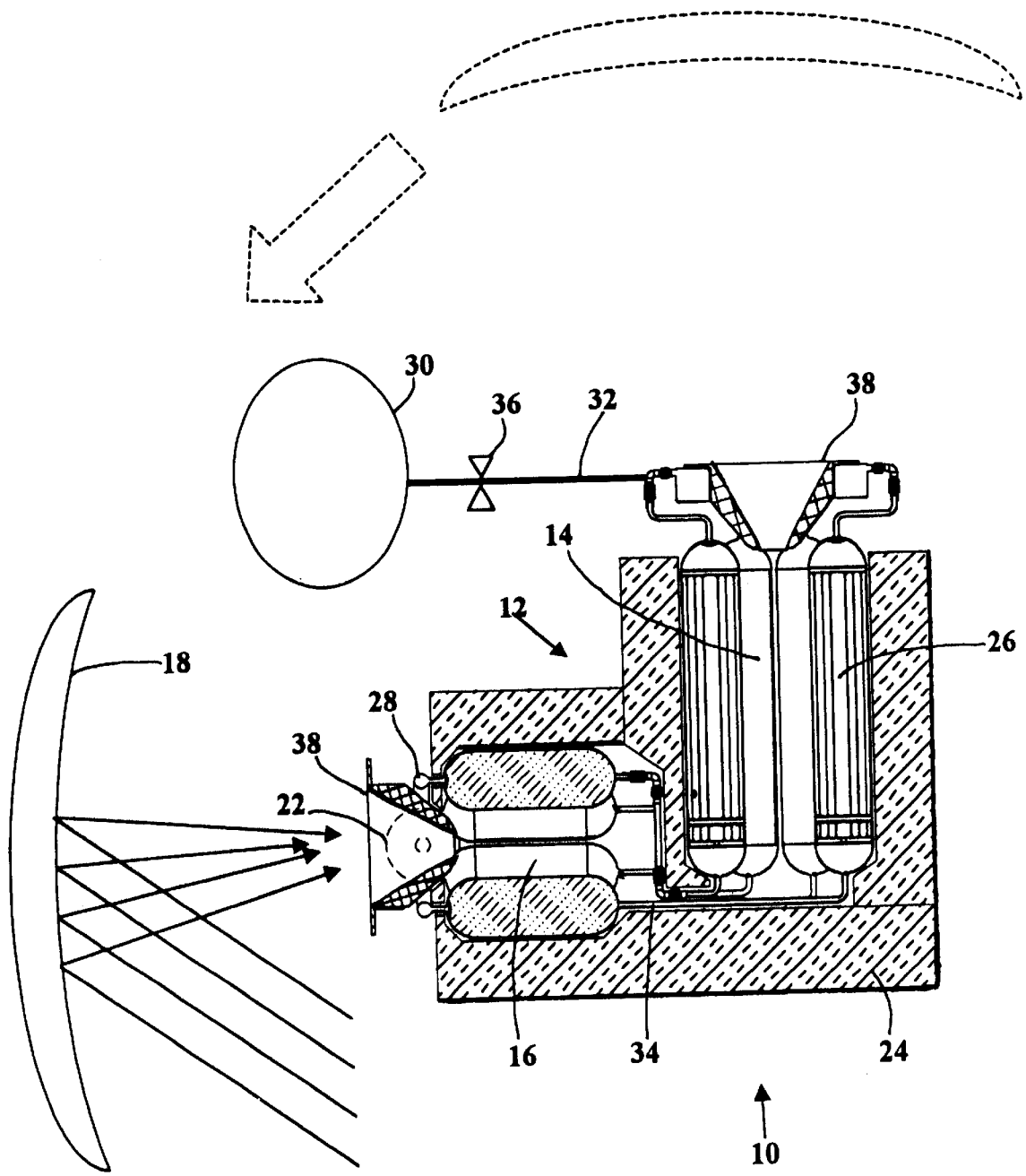
FIG. 4 schematically illustrates the alternate embodiment of the invention in position for directing solar energy to the direct gain section.

FIGS. 3 and 4 illustrate an alternate embodiment of the invention where the means for selectively directing solar energy to either the thermal energy storage section 12 or the direct gain section 14 is provided in the form of relative rotation between the solar concentrator and the solar energy receiver. In this embodiment, the thermal energy storage section is provided with one or more apertures in the wall for receiving the solar rays. As indicated above, a secondary solar concentrator 38 may be provided in the aperture to reduce the aperture size. Also, the direct gain section 16 is not positioned around the aperture in the walls of the thermal energy storage section 14. The relative rotation may be in the form of rotating either the solar energy receiver 12 or the solar concentrator 18. In the first position seen in FIG. 3 the solar rays and energy are directed into the thermal energy storage section 14 for solar energy collection and storage. In the second position seen in FIG. 4 the solar rays are directed to the direct gain section 16 for heating thereof during the propulsion phase. Propellant is supplied from propellant supply 30 to the thermal energy storage section 14 via piping 32 where the propellant is pre-heated. The propellant then flows to the direct gain section 16 via piping 34 where it is heated to the propulsion temperature and then to the propellant nozzle 22 via piping 28 for producing thrust.

Although means 20 is illustrated as a rotating or butterfly valve in FIGS. 1 and 2, other types of mechanical switches might be used. The insulation could slide in and out, or a rotating design with windows could be used. Another option would be to use a radiative gap insulation (multi-foil insulation) and fill the gap with gas to "open" the heat flow and pump out the gas to "close" the heat flow.

The thermal energy storage and direct gain sections could be made from a variety of materials. The thermal energy storage material must have a high specific heat and must be compatible with hydrogen. Two material combinations are typically used in these designs, graphite with a rhenium coating/cladding or boron nitride with a tungsten coating/cladding. However, other material combinations are possible. The direct gain section is preferably made of rhenium. However other refractory metals are possible. Highly conductive composite materials may also be used if they can be made compatible with hydrogen and can contain the pressure loads of the propellant.

The invention provides the advantage of achieving the high performance of a direct gain rocket (i.e., high propellant temperatures) using small collectors/concentrators like a thermal energy storage rocket. This enables the rocket to use existing collector technology to achieve performance that otherwise would be decades away. The specific impulse of such a system is two to four times that of a conventional chemical rocket and thus can deliver significantly greater payloads to orbit from any launch vehicle.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A solar thermal rocket, comprising:
   a. a thermal energy storage section for initial heating of a propellant to a first temperature exceeding approximately 1570° K;
   b. a direct gain section for continued heating of said propellant to a second temperature at which said propellant may be effectively used as a rocket fuel, said direct gain section being in fluid communication with said thermal energy storage section;
   c. a propulsion nozzle in fluid communication with said direct gain section;
   d. a solar concentrator that focuses solar energy toward said thermal energy storage section and said direct gain section;
   e. means for selectively directing solar energy from said solar concentrator to either said thermal energy storage section or said direct gain section;
   f. a propellant storage container, said container being in fluid communication with said thermal energy storage section; and
   g. a propulsion nozzle in fluid communication with said direct gain section.

2. The rocket of claim 1, wherein said means for selectively directing solar energy comprises insulation between said thermal energy storage section and said direct gain section, said insulation being movable between a first open position where solar energy is directed to said thermal energy storage section and a second closed position where solar energy remains in said direct gain section.

3. The rocket of claim 1, wherein said means for selectively directing solar energy comprises means for causing relative rotation of said solar concentrator between said thermal energy storage and direct gain sections.

4. The rocket of claim 1, wherein said direct gain section comprises refractory metal tubes.

5. The rocket of claim 4, wherein said refractory tubes are constructed from rhenium.

6. The rocket of claim 1, wherein said thermal energy storage section is constructed from at least one material selected from the group consisting of: rhenium coated graphite and tungsten encapsulated boron nitride.

7. The rocket of claim 1, wherein said temperature of said propellant exceeds 2400° K.

* * * * *